United States Patent [19]

Nishi

[11] Patent Number: 5,109,298
[45] Date of Patent: Apr. 28, 1992

[54] GRADED-INDEX LENS

[75] Inventor: Hisami Nishi, Osaka, Japan

[73] Assignee: Nippon Sheet Glass Co., Ltd., Osaka, Japan

[21] Appl. No.: 585,687

[22] Filed: Sep. 20, 1990

[30] Foreign Application Priority Data

Sep. 20, 1989 [JP] Japan ................................. 1-243763

[51] Int. Cl.$^5$ .......................... G02B 3/00; G02B 6/18
[52] U.S. Cl. ..................................... 359/654; 385/124
[58] Field of Search .................. 350/413, 96.31, 96.25; 359/654; 385/124

[56] References Cited

U.S. PATENT DOCUMENTS

| 3,658,407 | 4/1972 | Kitano et al. | 350/413 X |
| 4,634,233 | 1/1987 | Usami et al. | 350/413 |
| 4,668,053 | 5/1987 | Nishi et al. | 350/413 |
| 4,744,620 | 5/1988 | Ueno et al. | 350/413 X |

OTHER PUBLICATIONS

Journal of the Optical Society of America, Nov. 1970, vol. 60, No. 11, pp. 1436-1443, "Third-Order Aberrations of Inhomogeneous Lenses".

Primary Examiner—Scott J. Sugarman
Attorney, Agent, or Firm—Dickstein, Shapiro & Morin

[57] ABSTRACT

A graded-index lens for focusing an erect unmagnified image out of the lens has a refractive index varying radially in a cross-sectional plane normal to the optical axis thereof. The graded-index lens comprises a cylindrical medium whose refractive index at a radial distance r from an optical axis within a cross-sectional plane normal to the optical axis, is expressed by:

$$n^2(r) = n_0^2[1 - (gr)^2 + h_4(gr)^4]$$

where $n_0$ is the refractive index on the optical axis, g is a parameter indicating the gradient of the varying refractive index, and $h_4$ is a fourth-order refractive index distribution coefficient, the fourth-order refractive index distribution coefficient $h_4$ being in the range of:

$$0.6 < h_4 < 1.0.$$

5 Claims, 6 Drawing Sheets

GRADED-INDEX LENS

BACKGROUND OF THE INVENTION

1. Field of the Invention

The present invention relates to a lens system for focusing an image of an original or a light-emitting element as an erect image of an equal or unmagnified size on a photosensitive drum or a light detector in an optical copying machine, a facsimile, or an optical printer.

2. Description of the Relevant Art

FIG. 1 of the accompanying drawings shows a lens array 2 comprising a plurality of cylindrical lenses 1 each having a refractive index varying radially in a cross-sectional plane normal to an optical axis z. Each of the cylindrical lenses 1 has flat opposite end surfaces, i.e., flat entrance and exit end surfaces. The cylindrical lenses 1 are arrayed with their optical axes lying parallel to each other. The lens array 2, which serves to focus an erect image of an equal or unmagnified size, is widely used in the art. Each lens 1 has a radius $r_0$ and a length $z_0$.

The refractive index, $n(r)$, of cylindrical lens 1 is given as a function of the radial distance r from the optical axis in a cross-sectional plane normal to the optical axis, as follows:

$$n^2(r) = n_0^2[1-(gr)^2]\ldots \quad (1)$$

where $n_0$ is the refractive index on the optical axis and g is a parameter indicating the gradient of the varying refractive index.

An erected unmagnified image of an object can be formed out of the lens under the condition: $\pi < g \cdot z_0 < 2\pi$. When the distance from the object to the lens surface (entrance end surface) is infinite, $g \cdot z_0 = \pi$, and when the distance from the object to the lens surface is zero, $g \cdot z_0 = 2\pi$.

The individual lenses 1 of the lens array 2 which employs such a graded-index medium and can focus an erect unmagnified image have focusing characteristics such that, with the refractive index varies as indicated by the equation (1), the on-axis spherical aberration is not corrected sufficiently as shown in FIGS. 2a and 2b, and the off-axis field curvature is large as shown in FIGS. 3a and 3b. As a result, the lens array 2 cannot focus a parallel beam of light into a small spot, and fails to achieve high resolution.

FIGS. 2a and 2b are diagrams of transverse aberration when FOB=0 and FIGS. 3b and 3b are diagrams of transverse aberration when FOB=0.8. In FIGS. 2a through 3b, FOB represents the fractional object height, and FPR the fractional pupil radius. The relationship between FOB, FPR, $\Delta X$, and $\Delta Y$ is shown in FIGS. 11a and 11b.

$\Delta Y$ indicates a Y component of a distance by which a ray R from an object O deviates from a chief ray Rc in an image plane in FIGS. 2a and 3a, and $\Delta X$ indicates an X component of the distance in FIGS. 2b and 3b. The fractional object height FOB is given by:

FOB = OBY/OBYmax where OBY is an object height and OBYmax is a maximum object height. The normalized pupil radius FPR is given by:

FPR = $\rho$/$\rho$max where $\rho$ is the distance of the ray R from an entrance pupil center $P_1$ in an entrance pupil, and $\rho$max is the maximum distance of the ray R from the entrance pupil center $P_1$ in the entrance pupil, i.e., the radius of the entrance pupil.

SUMMARY OF THE INVENTION

According to the present invention, a graded-index lens has a refractive index $n(r)$ at a radial distance r from an optical axis within a cross-sectional plane normal to the optical axis, the refractive index $n(r)$ being expressed by:

$$n^2(r) = n_0^2[1-(gr)^2 + h_4(gr)^4]\ldots \quad (2)$$

where $n_0$ is the refractive index on the optical axis, g is a parameter indicating the gradient of the varying refractive index, and $h_4$ is a fourth-order refractive index distribution coefficient, and the fourth-order refractive index distribution coefficient $h_4$ is in the range of:

$$0.6 < h_4 < 1.0.$$

More specifically, the quartic term of the equation (2) can control third-order spherical aberrations as shown in *Third-Order Aberrations of Inhomogeneous Lenses* written by P. J. Sands, J.O.S.A., 60, pages 1436~(1970). In order to correct the spherical aberration, the coefficient $h_4$ of the quartic term is appropriately selected, thereby improving the resolution over the entire image plane. If the coefficient $h_4$ is selected to be $h_4 = 0.56$, for example, the on-axis spherical aberration can completely be corrected. As shown in FIGS. 5a and 5b, however, the off-axis aberration is considerably large because it is greatly affected by the field curvature. To avoid this, according to the present invention, the coefficient $h_4$ is selected to be $h_4 > 0.6$, so that the spherical aberration is excessively corrected. However, unless the coefficient $h_4$ were selected to be $h_4 < 1.0$, the resolution would be lowered over the entire image plane.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 2b is a graph showing an X component of the transverse aberration in FIG. 2a;

FIG. 3b is a graph showing an X component of the transverse aberration in FIG. 3a;

FIG. 4b is a graph showing an X component of the transverse aberration in FIG. 4a;

FIG. 5b is a graph showing an X component of the transverse aberration in FIG. 5a;

FIG. 6b is a graph showing an X component of the transverse aberration in FIG. 6a;

FIG. 7b is a graph showing an X component of the transverse aberration in FIG. 7a;

DETAILED DESCRIPTION OF THE PREFERRED EMBODIMENTS

Figure 1:
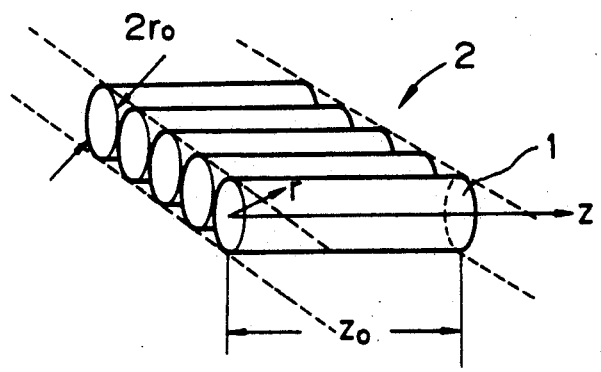
FIG. 1 is a perspective view of a graded-index lens array, the view being illustrative of the configuration and dimensions of the lens array.
Figure 2A:
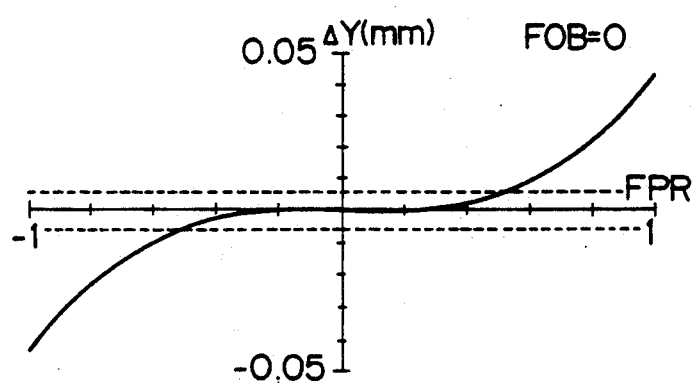
FIG. 2a is a graph showing a Y component of a transverse aberration of a conventional single lens with a fourth-order refractive index distribution coefficient $h_4 = 0$, the Y component being calculated with respect to a normalized object height FOB=0.
Figure 2B:
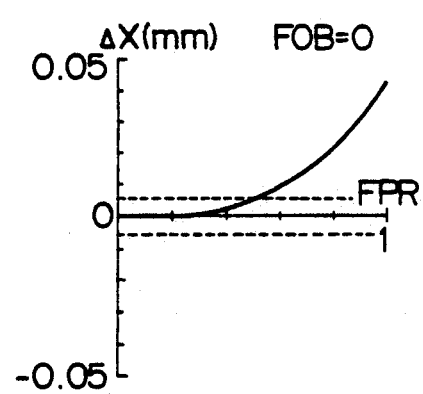
Figure 3A:
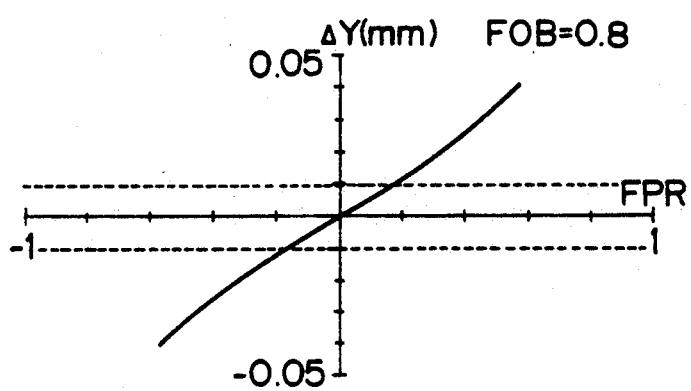
FIG. 3a is a graph showing a Y component of a transverse aberration of a conventional single lens with a fourth-order refractive index distribution coefficient $h_4 = 0$, the Y component being calculated with respect to a normalized object height FOB=0.8.
Figure 3B:
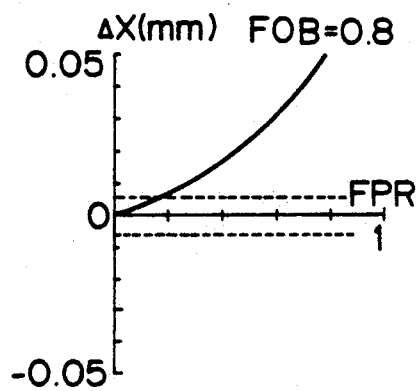
Figure 4A:
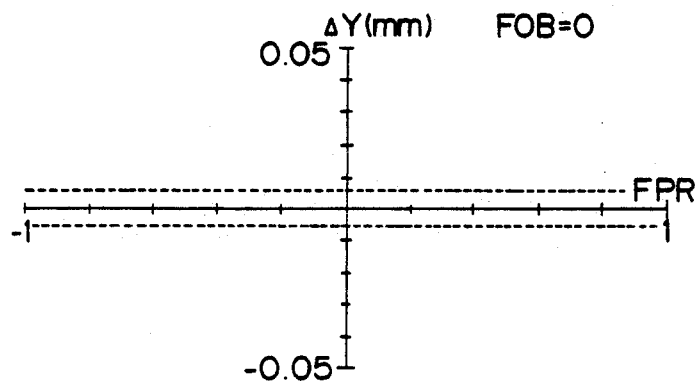
FIG. 4a is a graph showing a Y component of a transverse aberration of a single lens with a fourth-order refractive index distribution coefficient h₄ =0.56, the Y component being calculated with respect to a normalized object height FOB=0.
Figure 4B:
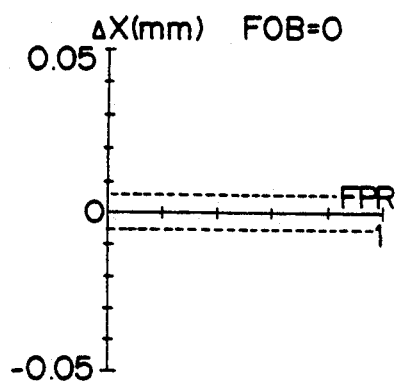
Figure 5A:
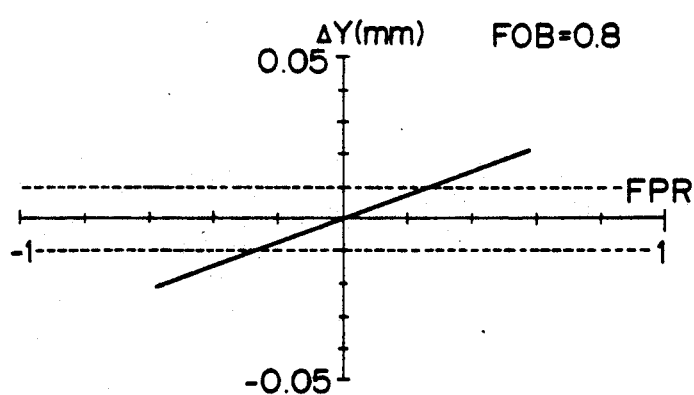
FIG. 5a is a graph showing a Y component of a transverse aberration of a single lens with a fourth-order refractive index distribution coefficient h₄ =0.56, the Y component being calculated with respect to a normalized object height FOB=0.8.
Figure 5B:
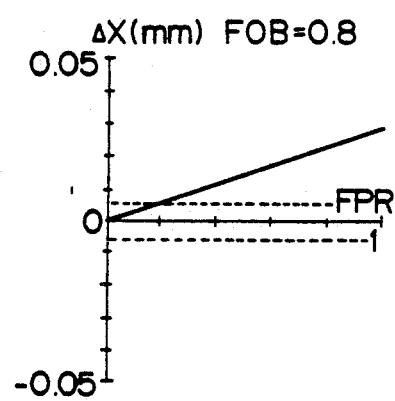
Figure 6A:
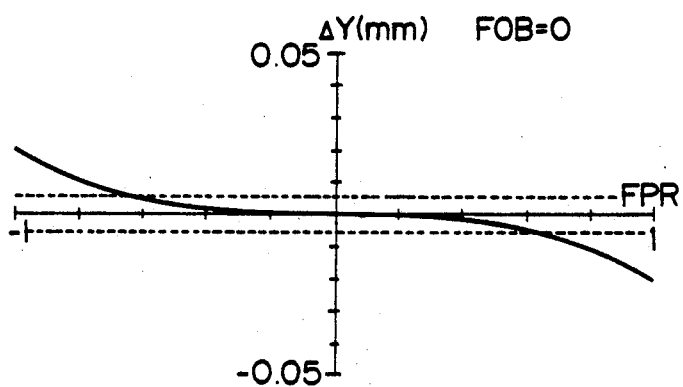
FIG. 6a is a graph showing a Y component of a transverse aberration of a single lens according to the present invention, with a fourth-order refractive index distribution coefficient h₄=0.8, the Y component being calculated with respect to a normalized object height FOB= 0.
Figure 6B:
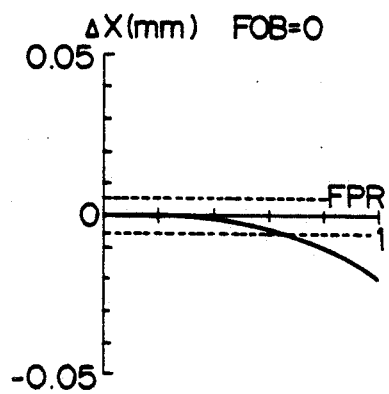
Figure 7A:
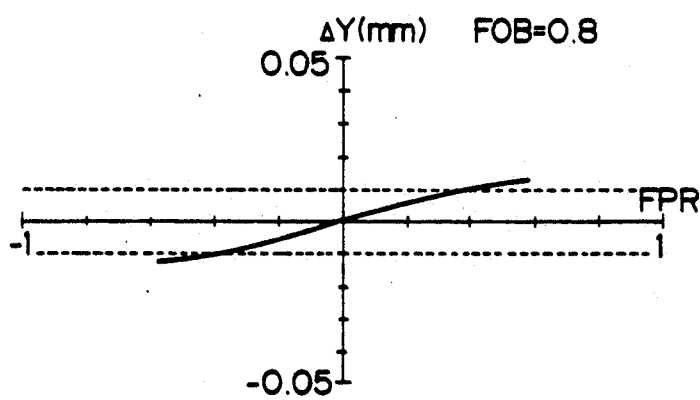
FIG. 7a is a graph showing a Y component of a transverse aberration of a single lens according to the present invention, with a fourth-order refractive index distribution coefficient h₄ =0.8, the Y component being calculated with respect to a normalized object height FOB = 0.8.
Figure 7B:
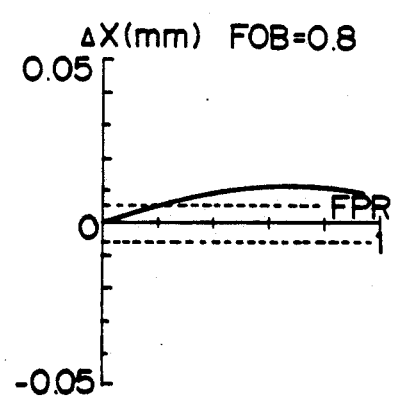

FIGS. 6a, 6b and 7a, 7b show transverse aberrations of single lenses with the coefficient h₄=4 in the equation (2) above. Since the spherical aberration on the axis is excessively corrected, as shown in FIGS. 6a and 6b, the spot radius is slightly increased, and the resolution is lower than when the spherical aberration is completely corrected (see FIGS. 4a through 4b). However, since the field curvature is corrected off the axis, as shown in FIGS. 7a and 7b, the aberration is smaller and the resolution is greater than when the spherical aberration is completely corrected (see FIGS. 5a through 5b).

Figure 8:
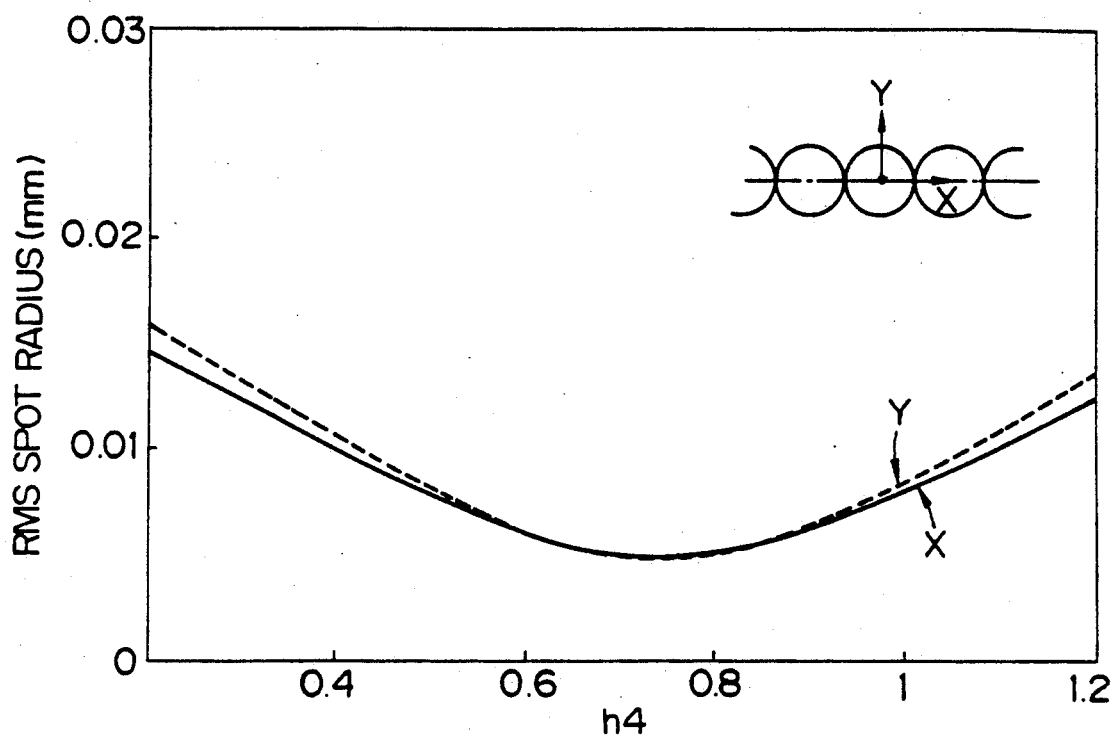
FIGS. 8 through 10 are diagrams showing the relationship between the coefficient h₄ and spot radius with respect to lens arrays comprising single, two, and three rows of lenses.
Figure 9:
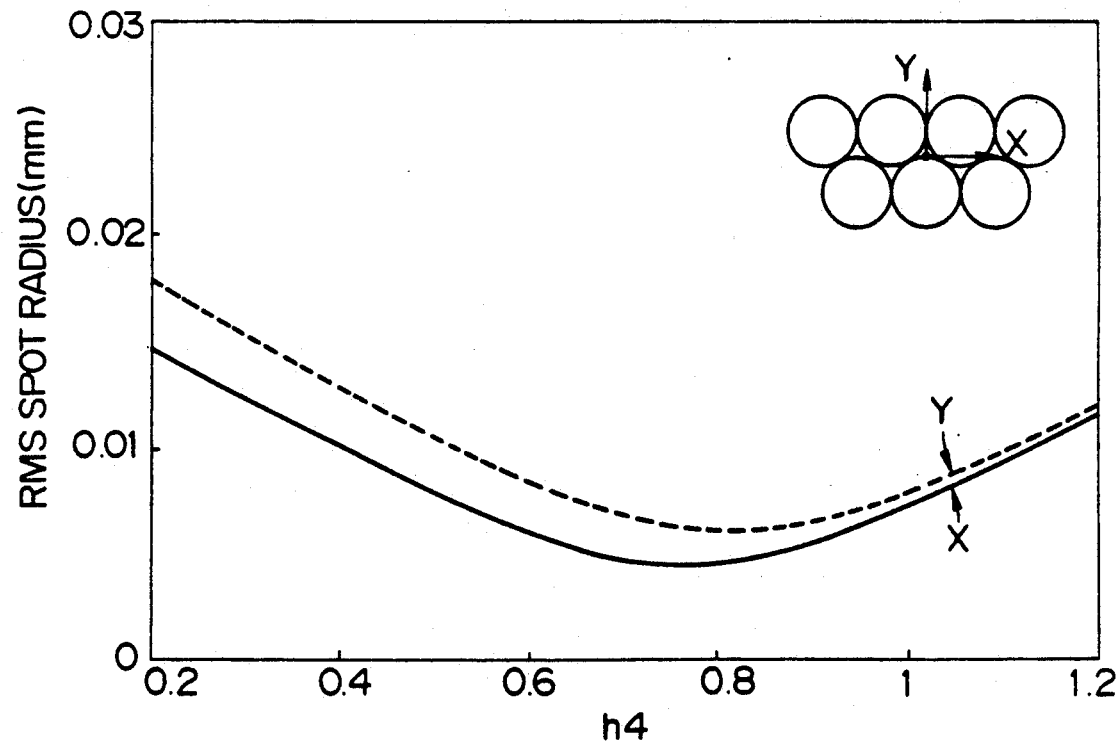
Figure 10:
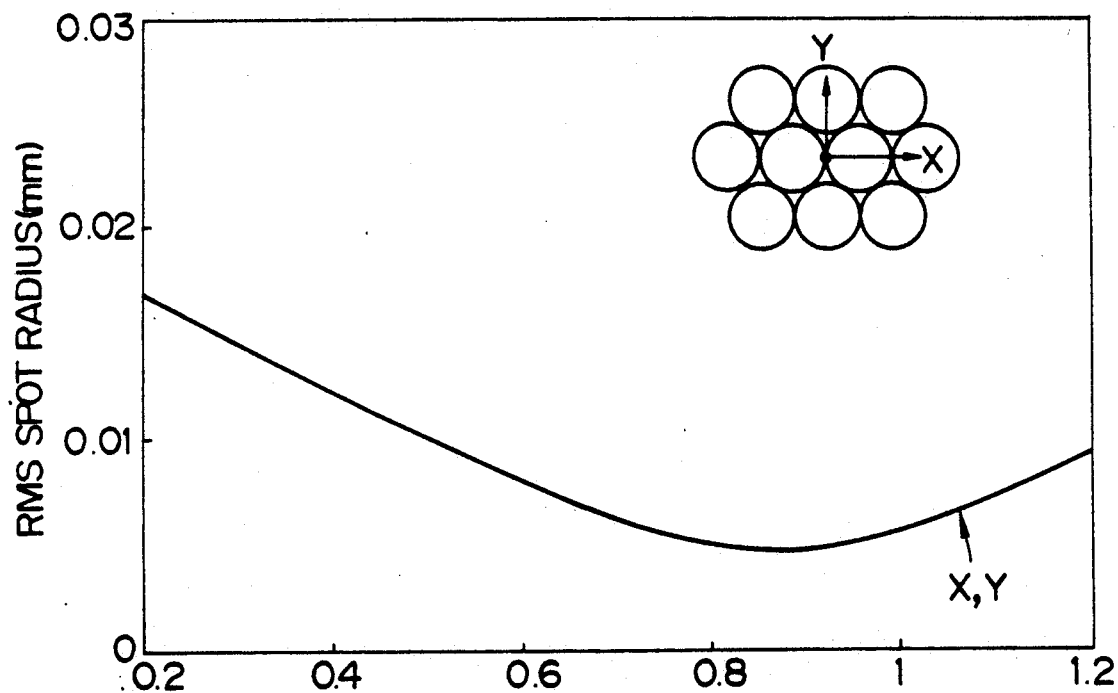
Figure 11A:
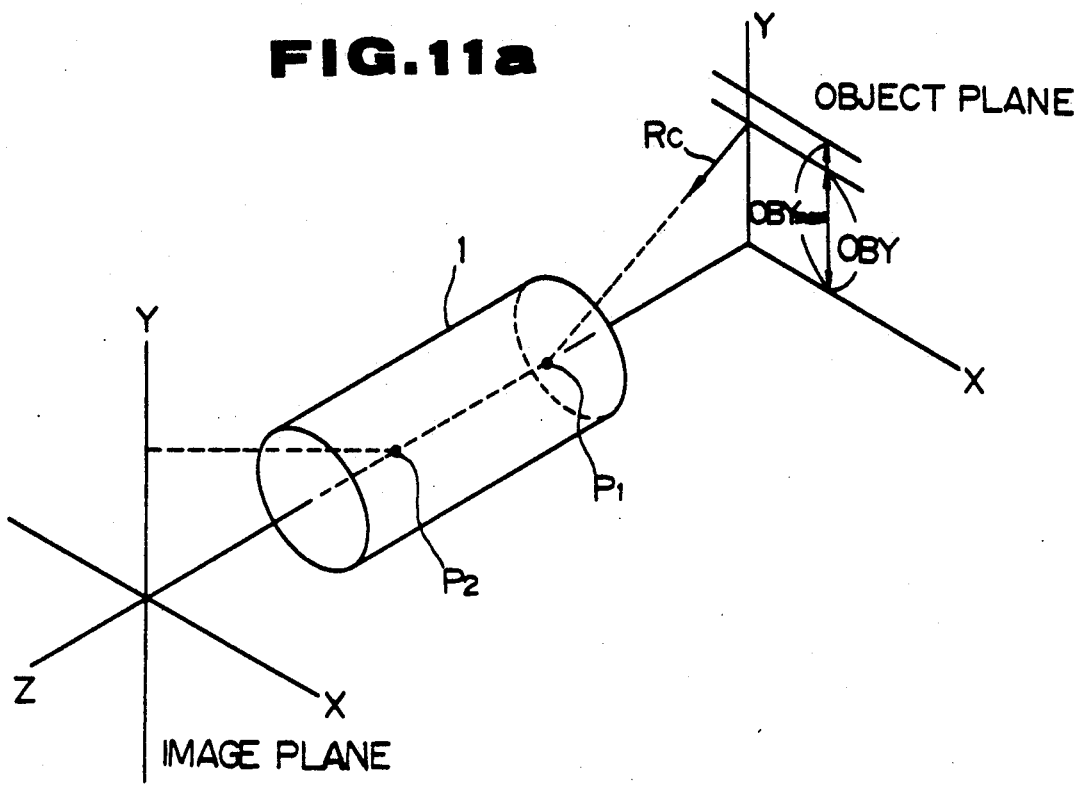
FIGS. 11a and 11b are schematic perspective views illustrative of the relationship between FPR, FOB, ΔX, and ΔY.
Figure 11B:
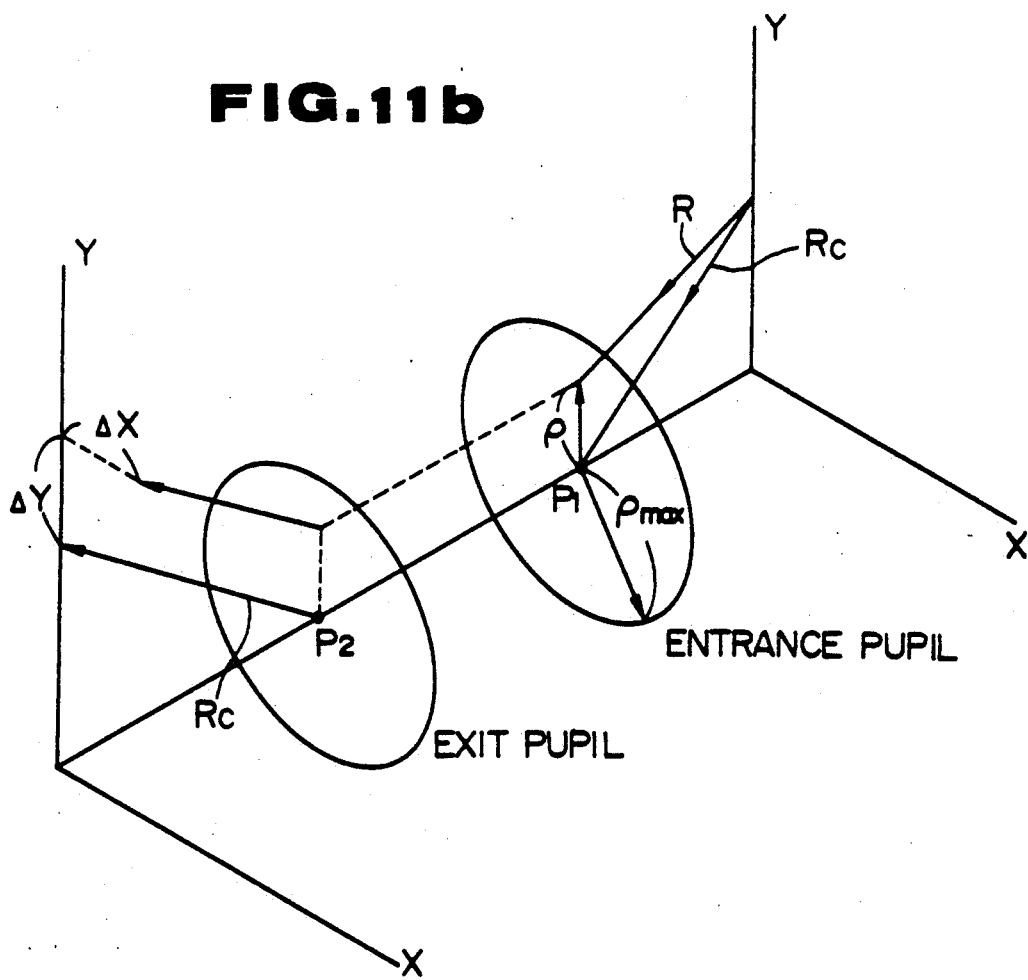

FIG. 8 shows the spot size (indicated by square mean value) of a lens array which comprises a single row of graded-index lenses held closely together, with $n_0=1.614$, $G=g \cdot r_0=0.12$, $g \cdot Z_0=1.2\pi$, and $r_0=0.5$ mm (hence g= 0.24), the spot size being expressed as a function of the fourth-order coefficient h₄. FIG. 9 shows the spot size of a lens array which comprises two rows of the same gradedindex lenses. FIG. 10 shows the spot size of a lens array which comprises three rows of the same graded-index lenses.

FIGS. 8 through 10 indicate that the spot size of any of the lens arrays is the smallest in the range of 0.6<h₄<1.0.

While the variable refractive index is expressed by the equation (2) above, it may be expressed by other equations, in which case the fourth-order coefficient of the polynominal indicating the variable refractive index corresponds to h₄ according to the present invention.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. A lens array comprising a plurality of graded-index lenses for focusing an erect unmagnified image out of the lens array, said graded-index lenses being arranged with their respective optical axes lying parallel to each other, each of said lenses comprising a cylindrical medium having flat opposite end surfaces and having a refractive index at a radial distance r from an optical axis within a cross-sectional plane normal to the optical axis, said refractive index being expressed by:

$$n^2(r)=n_o^2[1-(gr)^2+h_4(gr)^4]$$

where $n_o$ is the refractive index on the optical axis, g is a parameter indicating the gradient of the varying refractive index, and h₄ is a fourth-order refractive index distribution coefficient, said fourth-order refractive index distribution coefficient h₄ being in the range of:

$$0.6<h_4<1.0; \text{ and}$$

wherein, for each of said graded-index lenses, said parameter g is in the range of:

$$\pi<gZ_o<2\pi$$

where $Z_o$ is the length of the respective graded-index lens.

2. A gradedindex lens array according to claim 1, wherein said refractive index n₀ and said parameter g have respective numeral values:

$$n_0=1.614, g=0.24.$$

3. A graded-index lens array for focusing an erect unmagnified image out of the lens array, comprising at least one row of lenses with respective optical axes thereof lying parallel to each other, each of said lenses comprising a cylindrical medium having a refractive index at a radial distance r from an optical axis within a cross-sectional plane normal to the optical axis, said refractive index being expressed by:

$$n^2(r)=n_0^2[1-(gr)^2+h_4(gr)^4]$$

where n₀ is the refractive index on the optical axis, g is a parameter indicating the gradient of the varying refractive index, and h₄ is a fourth-order refractive index distribution coefficient, said fourth-order refractive index distribution coefficient h₄ being in the range of:

$$0.6<h_4<1.0.$$

4. A graded-index lens array according to claim 3, wherein said lens array comprises two rows of lenses with respective optical axes thereof lying parallel to each other.

5. A graded-index lens array according to claim 3, wherein said lens array comprises three rows of lenses with respective optical axes thereof lying parallel to each other.

* * * * *